…

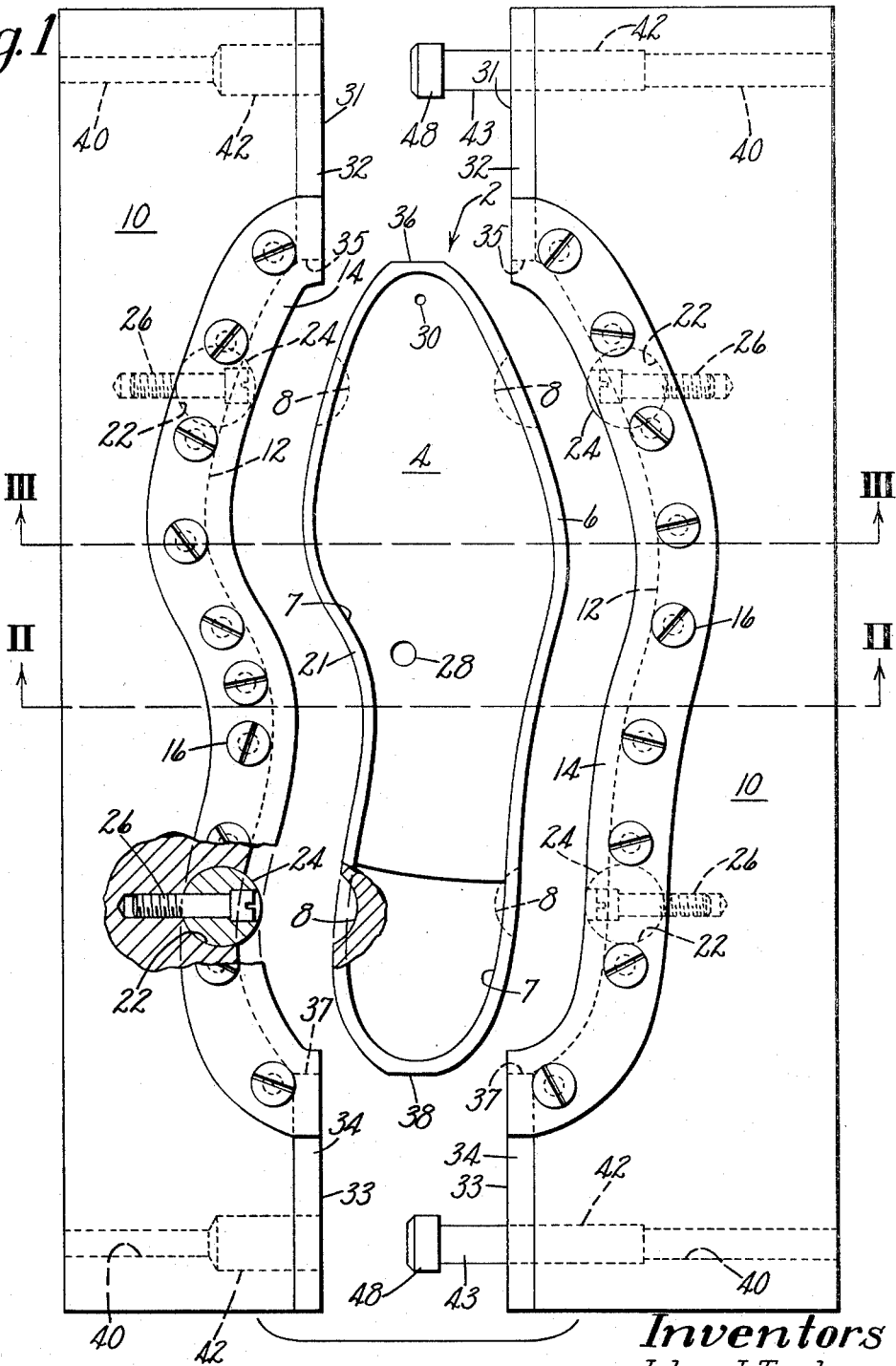

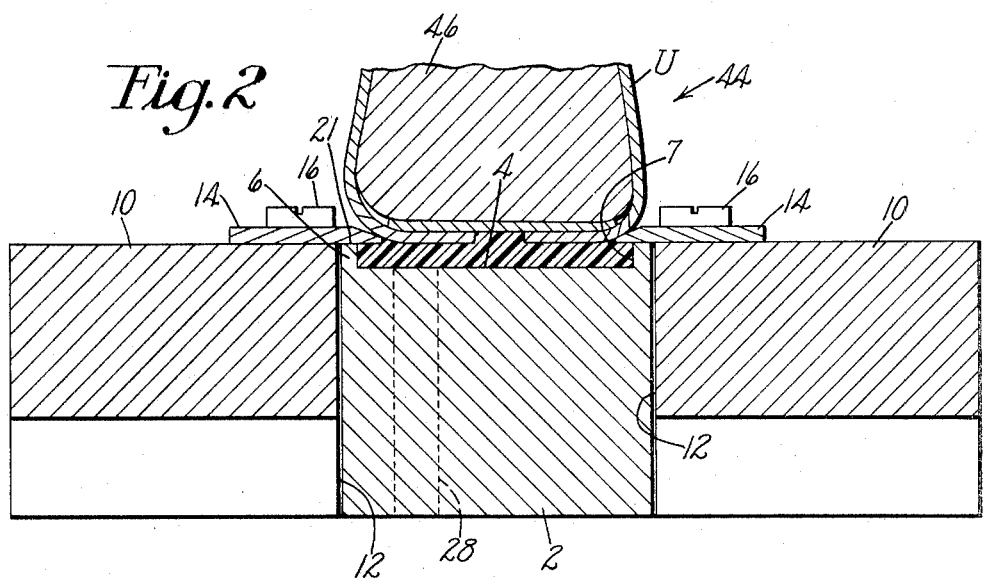
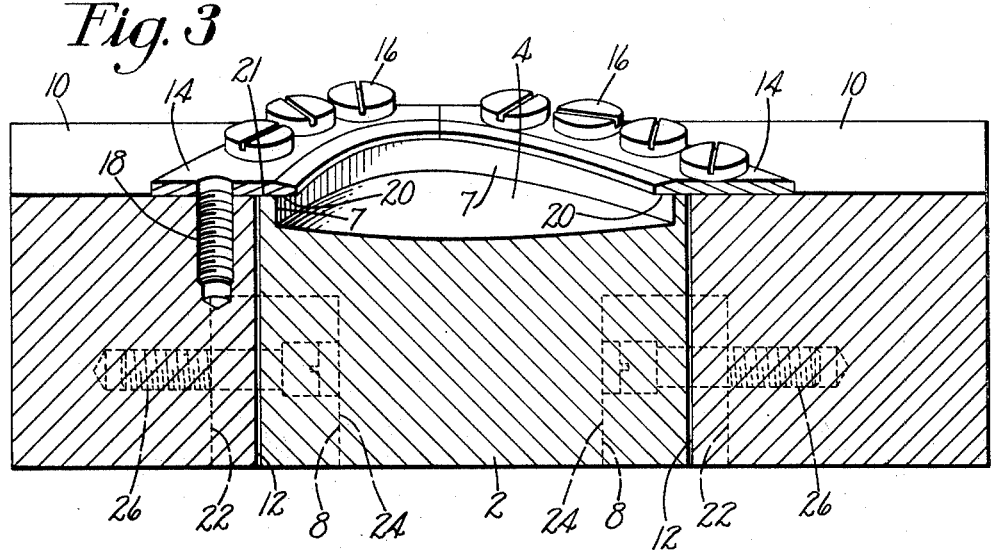

United States Patent Office 3,481,003
Patented Dec. 2, 1969

3,481,003
SHOE SOLE MOLD ASSEMBLY
John J. Taylor and Edward H. Wale, Leicester, England, assignors to United Shoe Machinery Corporation, Flemington, N.J., a corporation of New Jersey
Original application Aug. 29, 1966, Ser. No. 575,896. Divided and this application Oct. 9, 1967, Ser. No. 673,875
Int. Cl. B29c 5/00; B29f 1/00
U.S. Cl. 18—42   3 Claims

ABSTRACT OF THE DISCLOSURE

A mold assembly for injection molding of sole units directly onto uppers. The assembly comprises a bottom mold member recessed on its upper surface to form a cavity substantially the shape of the desired molded sole unit. The assembly further comprises side mold members having welt plates mounted thereon which, when the side mold members are in the closed position, are disposed over the peripheral portion of the recess of the bottom mold member.

CROSS REFERENCES TO RELATED APPLICATIONS

This is a division of application Ser. No. 575,896 filed Aug. 29, 1966, now abandoned, in the names of John J. Taylor and Edward H. Wale.

BACKGROUND OF THE INVENTION

This invention relates to mold assemblies and is directed more particularly to an injection molding assembly for use in molding shoe bottom units onto the bottoms of lasted uppers.

DESCRIPTION OF THE PRIOR ART

In the manufacture of shoes, it is now common practice to injection mold a sole or a sole and heel unit directly onto a lasted upper. The mold assemblies used in the molding of soles to uppers generally comprise a bottom mold member, and two side mold members which cooperate with a lasted upper to define a mold cavity. A molten elastomeric material is injected into the mold cavity until the cavity is filled. After sufficient cooling time has elapsed, the mold members are separated, exposing a newly molded sole attached to the bottom of the lasted upper.

While such mold assemblies have proved generally satisfactory in most respects, they suffer from the disadvantage of causing a parting line to be formed on the edge of the molded sole where the side mold members abut one another. Frequently "flash" is evident at the toe and heel end portions of the molded sole in the area of the mold assembly joint line of the side mold members, necessitating a flash removing operation.

SUMMARY OF THE INVENTION

It is an object of the present invention to provide an improved mold assembly for the injection molding of sole units directly onto the bottoms of lasted uppers.

Another object of the invention is to provide such a mold assembly in which the arrangement of mold members is such as to avoid the forming of flash on the edge of the finished product.

A still further object of the invention is to provide such a mold assembly in which there is employed a novel means for assuring proper alignment of various mold members with one another when they are in the closed, or mold charging, position.

With the above and other objects in view, as will hereinafter appear, the present invention in one aspect contemplates, in an injection sole molding assembly comprising a bottom mold member recessed on its upper surface to form a cavity substantially the shape of the desired molded sole unit, the provision of first and second welt defining means which are mounted for movement between a closed position in which they abut each other and fit closely around the bottom mold member, and an open position in which the welt defining means are disposed away from the bottom member. Each welt defining means may have associated therewith a welt plate or an integral portion which, when the welt defining means is in the closed position, is disposed over a peripheral portion of the recess of the bottom mold member.

In accordance with a further feature of the invention, the welt defining means are provided with aligning members which are engageable with complementarily shaped openings in the sides of the bottom mold member to accurately align the welt defining means with the bottom mold member during the mold closing operation.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

FIG. 1 is a plan view of one form of mold assembly illustrative of an embodiment of the invention;

FIG. 2 is a sectional view along line II—II of FIG. 1 with the welt defining means shown in the closed position; and FIG. 3 is a sectional view taken along line III—III of FIG. 1, again with the welt defining means in the closed position.

DESCRIPTION OF THE PREFERRED EMBODIMENT

Referring to the drawings, it will be seen that the illustrative mold assembly includes a bottom mold member 2 having a recess 4 in its upper surface. The recess 4 forms a cavity of the size and shape desired of the sole unit to be molded. The recess 4 is joined by a wall 6 which affords a continuous surface 7 for the molding of the edge surface of a sole and heel unit thereby eliminating the possibility of a flash line being formed on the edge of the sole. The bottom mold member 2 is provided with openings 8 which receive alignment means associated with the bottom mold member to insure proper alignment of the side members with a pair of side members 10, as will be described below.

The side members 10 comprise welt defining means which may be integral or may be welt plate carriers having welt plates attached thereto, the latter being preferable. In which case, each welt plate carrier 10 has attached thereto a welt plate 14, which may be secured to the welt plate carriers by screws 16 received in threaded bores 18 (FIG. 3). The welt plate carriers 10 have inner surfaces 12 which are complementarily engageable with the bottom mold member 2. The lower surface 20 of the welt plate 14 is slidably engageable with the upper edge 21 of the wall 6 when the welt plate carriers approach the closed position, as may be seen in FIGS. 2 and 3. When the welt plate carriers are in the fully closed position, a portion of the surface 20 of the welt plates 14 overlies the periphery of the recess 4 which defines the upper surface of a simulated welt integral with the shoe sole. Each welt plate carrier 10 is provided with openings 22 in which are fixed cylindrical members 24, as by screws 26. The surface portions of the cylindrical members 24 which are not disposed within the openings 22 are complementarily engageable with the openings 8 located in the bottom mold member 2. The cylindrical members 24 are of a size substantially the same as the combined size of a welt plate carrier opening 22 and a bottom mold member opening 8. Thus, when the welt plate carriers are in the fully closed position, the cylindrical members 24 are disposed partially in the openings 22 and partially in the openings 8. As the welt plate carriers approach the closed position, the cylindrical members 24 serve to properly align the welt plate carriers, and thereby the welt plates, with the bottom mold member.

The bottom mold member 22 is provided with a sprue passage 28 through which the molten elastomeric material is forced to enter the mold cavity by an injection means not shown. The mold assembly may be provided with an air tell-tale orifice 30 connected to an air tell-tale system which is not shown, but which is well known in the art and acts in conjunction with a cut-off valve (not shown) to automatically shut down the operation of the molten material injection means. Alternative shut-down systems may be used in place of the air tell-tale system.

The welt plate carriers 10 may have fixed thereto toe abutment plates 32 and heel abutment plates 34 (FIG. 1). The abutment plates 32 and 34 have opposed planar surfaces 31, 33 which opposed surfaces are engageable with each other respectively. In addition, the toe abutment plates 32 are provided with edge surfaces 35 and the heel abutment plates 34 are provided with edge surfaces 37 which are engageable with the bottom mold member 4. When the welt plate carriers are in the closed position the toe abutment plates 32 engage each other and, in addition, slidably engage a planar surface 36 located on the outside of the wall 6 in the area of the toe portion of the bottom mold member. In like manner, the heel abutment plates 34 engage not only each other, but also a planar surface 38 located on the outside of the wall 6 in the area of the heel portion of the bottom mold member. The engagement of the surfaces 35, 37 of the abutment plates 32, 34 with the planar surfaces 36, 38 respectively, serves to accurately align the welt plate carriers with the bottom mold member upon closing of the mold assembly.

The welt plate carriers are provided with bores 40 having enlarged portions 42. Fitted into each of the bores 40 of one of the welt plate carriers 10 is one end of a locating pin 43 the other end of the pin being receivable by the opposed bore 40 of the other welt plate carrier. When the welt plate carriers approach each other the free ends of the pins 43 enter the opposed bores 40 further to insure proper alignment of the welt plate carriers relative to each other.

A top mold member 44 (FIG. 2) is engageable with the welt plates 14 to completely enclose a mold cavity defined by the bottom mold member, welt plates and top mold member. The top mold member in the illustrative example comprises an upper U mounted upon a last or footform 46.

The illustrative mold assembly is suitable for use in existing injection molding machines, as for example, those described in U.S. patent application Ser. No. 388,070, filed Aug. 7, 1964, now Patent No. 3,339,236, in the names of Leslie C. Battell et al., and Ser. No. 452,213, filed Apr. 30, 1965, now Patent No. 3,358,333, in the names of Charles J. Kitchener et al. Such machines include means for mounting a bottom mold member, means for moving side mold members into and out of engagement with each other and with the bottom mold member, and means for moving a lasted upper into engagement with the side mold members to enclose a mold cavity. In order to utilize the present invention in such machines, the bottom mold member 2 is substituted for the regular bottom mold member and the welt plate carriers 10 are substituted for the usual side mold members.

In operation, the mold members are initially in the "open" position, that is the welt plate carriers and footform are located outwardly from the stationary bottom mold member. An upper is placed upon the footform and the welt plate carriers are caused by side mold moving means, fully described in the above referred-to patent applications, to move toward each other and toward the bottom mold member.

As the welt plate carriers 10 move toward each other the free ends of the locating pins 43 engage the opposed bores 40. The free ends of the pins 43 are provided with tapered heads 48 which permit the pins 43 to "find" the opposed bore 40 in the event the pins and bores are slightly misaligned. Proceeding further, the pins 43 enter the bores 40 and insure proper alignment of the welt plate carriers relative to one another. Shortly thereafter, the cylindrical members 24 engage the openings 8 in the bottom mold member and thereby serve to align the welt plate carriers, and thereby the welt plates, with the bottom mold member. In addition, the abutment plates 32, 34 engage the planar surfaces 36, 38 respectively, further to insure proper alignment of the side mold members with the bottom mold member. In the "closed" position the abutment plates 32 are in engagement with each other, as are the abutment plates 34.

The footform 46, with an upper U fitted thereon, is then moved into position to engage the welt plates 14 and thereby enclose the mold cavity. Injection means, not shown, but fully described in the above-mentioned patent applications, then causes the sole material, in molten form, to enter the mold cavity through the sprue passage 28. When the mold cavity is filled, the air tell-tale orifice 30 is covered and the automatic shut-down system operates to terminate the injection of fluid. After sufficient cooling time has passed, the welt plate carriers are moved outwardly from the bottom mold member and the footform is moved in a direction away from the bottom mold member. As the footform is moved, it carries with it the upper U with the newly molded-on sole and heel unit attached thereto. The soled upper is then taken from the footform and another upper placed thereon in preparation for another operating cycle.

Having thus described our invention, what we claim as new and desire to secure by Letters Patent of the United States is:

1. A shoe sole molding assembly comprising a bottom mold member having a recess in one surface, said recess being of a pre-selected sole configuration, a wall surrounding said recess and having an uninterrupted inside surface for forming the entire uninterrupted edge of a molded sole, said bottom mold member having openings in its side surfaces, welt plate carriers engageable with said bottom mold member, means mounted on said welt plate carriers for entering said openings in said bottom mold member and for engaging said bottom mold member, said means and said bottom mold member cooperating upon engagement of said means with said bottom mold member to guide said welt plate carriers into alignment with said bottom mold member, welt plates attached to said welt plate carriers and engageable with said wall and overlying said recess when the welt plate carriers are abutting said bottom mold member to define a simulated welt integral with the sole, and a top mold member engageable with said welt plates for enclosing the recess.

2. A shoe sole molding assembly comprising a bottom mold member having a recess in one surface, said recess being of a pre-selected sole configuration and having an uninterrupted inside surface for the forming of the edge of a molded sole, said bottom mold member having openings in side surfaces, welt defining means engageable with said bottom mold member and having aligning means associated therewith complemental to and engageable with said openings in said bottom mold member, said aligning means and said bottom mold member cooperating upon engagement of said means with said bottom mold member to guide said welt defining means into alignment with said bottom mold member, and a top mold member for enclosing the recess.

3. The invention according to claim 2 in which said openings in the bottom mold member are substantially semi-cylindrically shaped, and said means are cylindrically shaped members embedded in the bottom mold member engaging side of each welt defining means, said cylindrical members being so disposed in each welt defining means that a portion of each cylindrical member extends beyond the surface of said welt defining means, said portion being complemental to the corresponding opening in said bottom mold member.

References Cited

UNITED STATES PATENTS

| | | |
|---|---|---|
| 667,674 | 2/1901 | Butterfield. |
| 1,111,436 | 9/1914 | Butterfield. |
| 1,995,429 | 3/1935 | Laura. |
| 2,651,118 | 9/1953 | Root. |
| 3,339,236 | 9/1967 | Battell et al. |
| 3,358,333 | 12/1967 | Kitchener et al. |
| 2,820,251 | 1/1958 | Fraser. |
| 3,403,423 | 10/1968 | McMorrow et al. |

J. HOWARD FLINT, Jr., Primary Examiner

U.S. Cl. X.R.

18—34